United States Patent [19]

Grundy

[11] Patent Number: 5,051,121
[45] Date of Patent: Sep. 24, 1991

[54] SEGMENTED BUSHING TEMPERATURE CONTROLLER AND METHOD FOR USING SAME

[75] Inventor: Reed H. Grundy, Murrysville, Pa.

[73] Assignee: PPG Industries, Inc., Pittsburgh, Pa.

[21] Appl. No.: 530,755

[22] Filed: May 30, 1990

[51] Int. Cl.$^5$ .................... C03B 37/07; C03B 37/09
[52] U.S. Cl. ............................................. 65/1; 65/2; 65/12; 65/29; 65/162; 65/DIG. 4
[58] Field of Search ............... 65/1, 2, 12, 29, 162, 65/DIG. 4

[56] References Cited

U.S. PATENT DOCUMENTS

| | | | |
|---|---|---|---|
| 3,246,124 | 4/1966 | Trethewey | 219/501 |
| 3,540,001 | 11/1970 | Gormley et al. | 340/172.5 |
| 4,024,336 | 5/1977 | Jensen | 65/162 |
| 4,063,027 | 12/1977 | Varrasso et al. | 13/6 |
| 4,107,446 | 8/1978 | Pieper | 13/6 |
| 4,149,022 | 4/1979 | Hrycik | 13/6 |
| 4,162,379 | 7/1979 | Sebens et al. | 219/497 |
| 4,167,403 | 9/1979 | Coggin | 65/1 |
| 4,285,712 | 8/1981 | Thompson | 65/2 |
| 4,343,637 | 8/1982 | Shofner et al. | 65/2 |
| 4,511,792 | 4/1985 | Kawamura | 219/499 |
| 4,515,614 | 5/1985 | Barkhau et al. | 65/29 |
| 4,546,485 | 10/1985 | Griffiths et al. | 373/28 |
| 4,594,087 | 6/1986 | Kuhn | 65/1 |
| 4,657,572 | 4/1987 | Desai et al. | 65/1 |
| 4,738,700 | 4/1988 | Grundy | 65/1 |
| 4,780,120 | 10/1988 | Varrasso et al. | 65/29 |
| 4,787,926 | 11/1988 | Varrasso | 65/2 |

OTHER PUBLICATIONS

"Automatic Control Systems", Fourth Edition by Benjamin C. Kuo, published by Prentice-Hall, Inc., p. 471.

Primary Examiner—Robert L. Lindsay
Attorney, Agent, or Firm—Andrew C. Siminerio

[57] ABSTRACT

The present invention provides a method of controlling the temperature of a multiple segment fiber glass bushing. Sensors monitor the temperature of each individual segment and the current delivered to the bushing is adjusted so as to maintain the average bushing temperature at a predetermined value. In addition, the temperature of each individual segment is compared to a set point reference value and bushing current is shunted around each segment based on this comparison.

24 Claims, 2 Drawing Sheets

1

SEGMENTED BUSHING TEMPERATURE CONTROLLER AND METHOD FOR USING SAME

BACKGROUND OF THE INVENTION

1. Field of the Invention

This invention relates to controlling the temperature of a multiple-segment fiber glass bushing and, more particularly, to actively monitoring and controlling the temperature of each individual bushing segment.

2A. Technical Considerations

Glass fibers are produced by drawing multiple streams of molten glass at a given rate of speed through orifices or nozzles located in a heated container known in the fiber glass industry as a bushing. The bushings containing the molten glass are electrically heated and maintained at given temperatures to provide molten glass at the orifices or nozzles at a desired viscosity. The fibers drawn from the orifices or nozzles are gathered after they solidify into one or more strands and are collected on a collet into one or more forming packages.

In recent years, bushings have increased in size so that bushings having 800 to 2,000 or more orifices or nozzles are commonplace in the industry. It is also common practice to produce more than one strand from these larger bushings by winding, for example, four strands from a single bushing. Such an arrangement is generally referred to as a split-bushing. Typically, this is accomplished by dividing the bushing into sections with each section providing one strand. Splitting the bushing in this manner to produce more than one strand requires precise control of the bushing section temperatures so that the strands produced and collected on the collet have the same yardage, i.e., the same yards per pound of glass or, viewed in another way, the same weight of glass strand per package collected on the collet for a given period of time.

The development of technology for adjusting bushing heat patterns and controlling formation of the individual strands, and in particular the coefficient of variation in the filament diameters, has progressed from moving manual fin coolers, which provide large but somewhat imprecise bushing adjustments, to three and four terminal controllers which adjust the electrical current in each section of the bushing by shunting a controlled current around sections of the bushing to produce variable heating. However, with these types of controllers, there is no feedback of external process conditions such as overall bushing temperature. Thus, a long term glass flow adjustment could be performed but short term temperature variances persist.

It would be advantageous to provide a segmented bushing temperature controller that actively monitors and controls the temperature of each bushing segment by monitoring the status of the thermocouples as well as the overall thermal condition of the bushing.

2B. Patents of Interest

U.S. Pat. No. 3,246,124 to Trethewey teaches a temperature control device for a glass fiber forming bushing wherein the power to the bushing is based on the average temperature of the bushing.

U.S. Pat. No. 3,540,001 to Gormley et al. teaches a control circuit having at least two controllers which are operatively connected to provide interrelated operation. For example, a first controller can operate on a first process variable to provide a remote set point for a second controller. The second controller, in turn, operates to control a second process variable which directly affects the first variable.

U.S. Pat. No. 4,024,336 to Jensen teaches a circuit for controlling the temperature of a two-segment fiber glass forming bushing. The bushing control uses two temperature controllers and two full wave variable impedance devices to regulate the current transmitted from a power transformer to the two segments of the bushing.

U.S. Pat. No. 4,149,022 to Hrycik teaches a power control system for electrically melting glass in a vertically oriented type glass melting furnace. Multiple sets of electrodes are positioned at various levels within the furnace and a control means directs power to the electrodes, as necessary, to distribute electrical energy in the furnace.

U.S. Pat. No. 4,162,379 to Sebens et al. teaches an apparatus for maintaining a thermal system at a stabilized condition by reducing the control error. A feedback signal from the system is derived by linearly combining functions of the current through an electrical heating element and the voltage thereacross, respectively.

U.S. Pat. No. 4,515,614 to Barkhau et al. teaches a method of controlling molten glass temperature in an electrically heated forehearth. Separate circuit controls, temperature sensors and temperature set point control means are provided for electrodes on the side walls of the furnace. Glass temperature across the flow path is controlled and adjusted by separately controlling the flow of current on each side of the side wall.

U.S. Pat. No. 4,546,485 to Griffiths et al. teaches a method of equalizing the temperature of a fiber glass forming bushing by averaging the temperature across the bushing face plate and controlling the power input to the bushing in response to the measured average. The two halves of the bushing are controlled by placing a variable resistor in the power supply lines to the bushing and adjusting current input to the side in response to variations in weight or yardage measured for the two strands produced by the bushing.

U.S. Pat. No. 4,594,087 to Kuhn teaches a three terminal controller for a fiber glass bushing. The bushing temperature is measured by a plurality of thermocouples which produce an average temperature reading that is used to control the power fed to the bushing. The three terminal controller is connected across two sections of the bushing to regulate current flow in the two sections in order to control the amount of fiber produced in each section.

U.S. Pat. No. 4,657,572 to Desai et al. teaches a bushing balance controller which measures voltage drop across each segment of a multiple segment glass fiber forming bushing and the current flow in the bushing. These measurements produce error signals proportionate to the difference in the set point temperature and the instantaneous temperature of each segment of the bushing. Current is diverted from each segment of the bushing whose error signal is greater than the average error signal and current is supplied to the overall bushing when the sum of the error signals is greater than a preset value.

U.S. Pat. No. 4,738,700 to Grundy teaches the positioning of thermocouples in a fiber glass forming bushing at locations that eliminate or reduce signal noise. A controller averages the monitored temperatures of the thermocouples which, in turn, is used to regulate the current passing through the bushing.

U.S. Pat. No. 4,780,120 to Varrasso et al. teaches a balanced bushing controller for a multiple section glass fiber producing bushing. Thermocouples connected to all but one of the bushing sections inject power to those sections. A thermocouple connected to the last bushing segment controls the application of electrical energy to the entire bushing.

U.S. Pat. No. 4,787,926 to Varrasso teaches a digitally controlled apparatus for varying the temperature of a glass fiber forming bushing over a period of time. The digitally controlled apparatus is used in combination with a constant speed winder so as to adjust the temperature of the bushing to maintain a constant glass fiber diameter as the fiber is wound on the winder.

SUMMARY OF THE INVENTION

The present invention provides a method of controlling the temperature of a multiple segment fiber glass bushing. Sensors monitor the temperature of each individual segment and the current delivered to the bushing is adjusted so as to maintain the average bushing temperature at a predetermined value. In addition, the temperature of each individual segment is compared to a set point reference value and bushing current is shunted around each segment based on this comparison. In one particular embodiment of the invention, the set point reference is the negative value of the minimum temperature. For each bushing segment, the actual segment temperature is summed with the set point reference to produce an error current. If the error current is equal to 0, no current is shunted from that particular bushing segment. If the error current is greater than 0, current is shunted about that bushing segment in proportion to the error current.

DETAILED DESCRIPTION OF THE DRAWINGS

Figure 1:
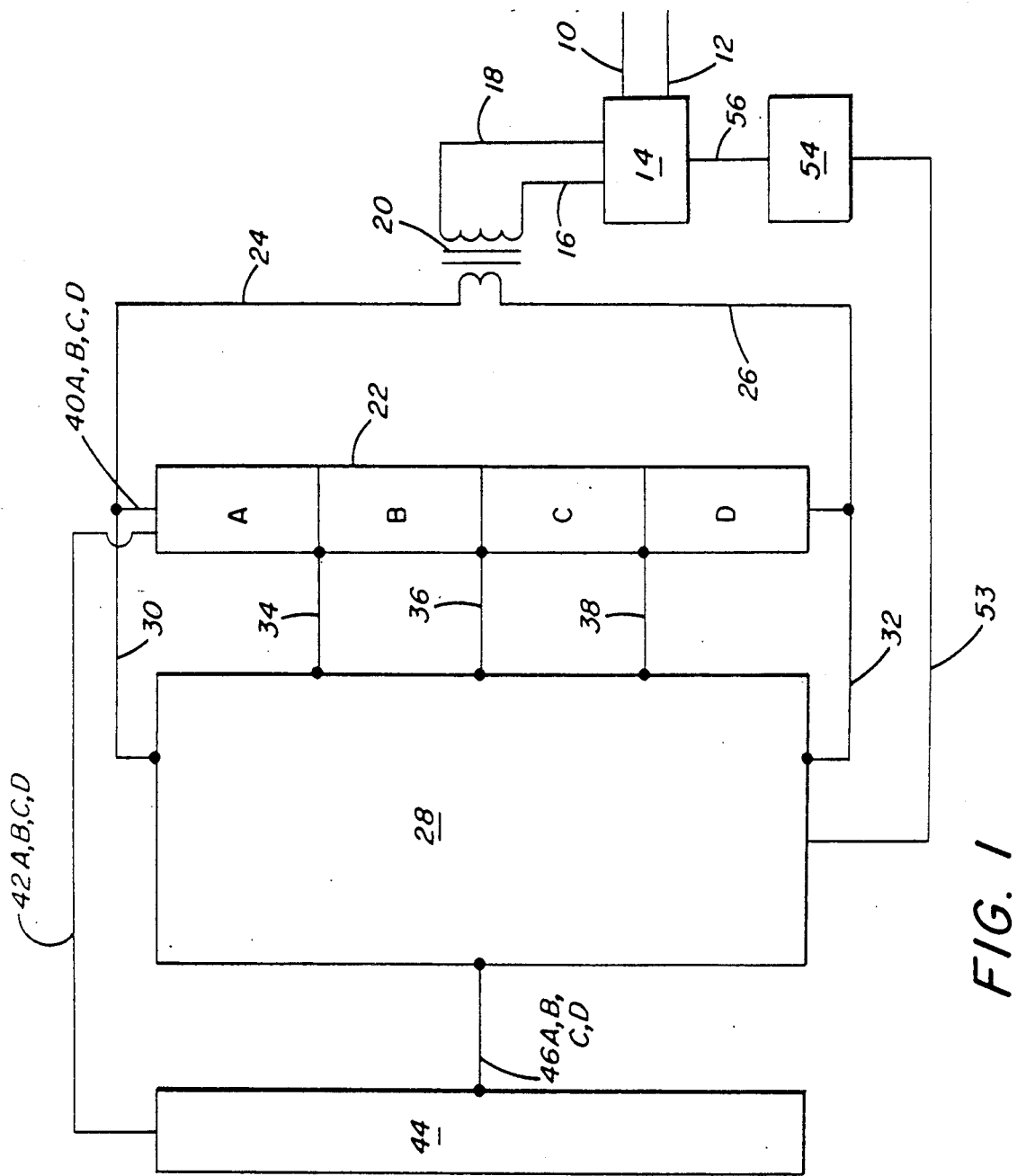
FIG. 1 is a block diagram of a fiber glass forming bushing and a bushing temperature controller incorporating features of the present invention.
Figure 2:
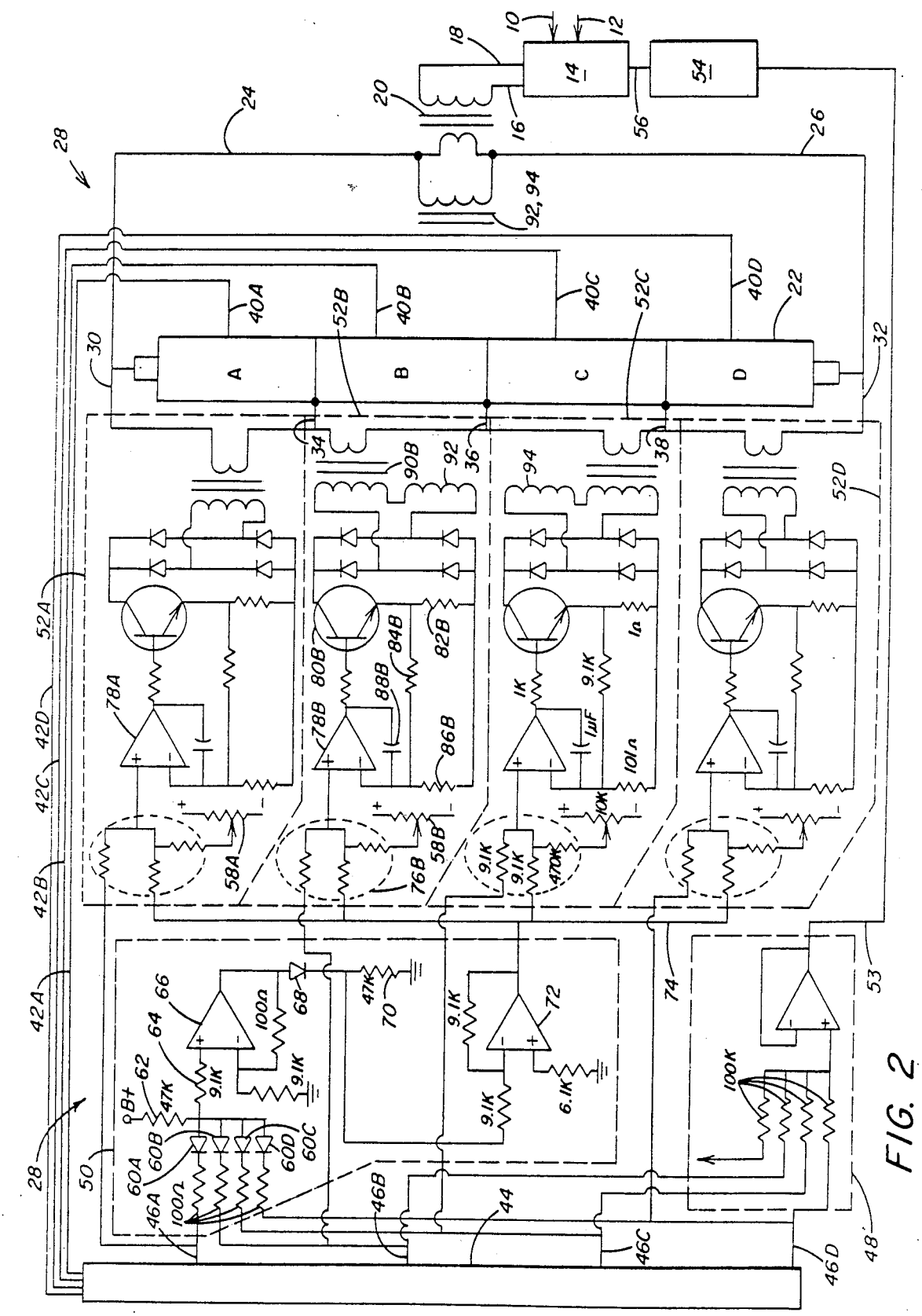
FIG. 2 is a detailed electrical schematic of the preferred embodiment of the bushing temperature controller illustrated in FIG. 1.

Referring to FIGS. 1 and 2, there is shown input mains 10 and 12 feeding into a power pack 14. Electrical leads 16 and 18 from power pack 14 feed current into the primary coil of a power transformer generally indicated at 20. The secondary coil of the transformer 20 and a multiple-segment bushing 22 are connected in parallel across electrical lines 24 and 26. Bushing temperature controller 28, which is the object of this invention, is connected across lines 24 and 26 and parallel with the transformer 20 and the bushing 22 via lines 30 and 32. Although not limiting in the present invention in the particular embodiment shown in FIG. 1, bushing 22 is divided into four sections—A, B, C, and D. Lines 30 and 32 along with additional lines 34, 36 and 38 interconnect each individual segment of the bushing 22 with the controller 28. These lines are used to direct current through shunting circuits in the controller 28 to control the amount of current passing from the transformer 20 through each individual segment, as will be discussed later in more detail, to provide the proper temperature in each bushing segment. Temperature sensors 40A, 40B, 40C and 40D measure each bushing segment temperature and feed their signal along lines 42A, 42B, 42C and 42D, respectively, to a converter 44 which collects and converts the sensor signals and feeds them to the controller 28 through lines 46A, 46B, 46C and 46D, respectively. Although not limiting in the present invention, in the preferred embodiment, the sensors 40 and convertor 44 are an Accufiber Inc. High Temperature Measuring System Model No. M-100 which receives the signals along optical fibers and measures and scales the segment temperatures in terms of voltage. As an alternative, the sensors 40 and convertor 44 may be a thermocouple and conventional solid state amplifier system such as an Analog Devices 2B50A isolated, thermocouple signal conditioner. These solid state amplifiers can be set to scale the bushing segment temperatures in terms of voltage as discussed above. In addition, improved control can be achieved by using a weighted combination of thermocouples, such as disclosed in U.S. Pat. No. 4,738,700 to Grundy, which teachings are hereby incorporated by reference. In particular, at least one thermocouple is positioned on the bottom of the bushing to provide an accurate determination of the average temperature of the bottom of the bushing.

The controller 28 controls the temperature of each individual segment of the bushing 22 by controlling both the overall current provided to the bushing 22 by transformer 20 and individually controlling the amount of current shunted from the bushing segment, based on the desired segment temperature.

Referring to FIG. 2, a preferred embodiment of the electric circuit diagram of the controller 28 shows a temperature averaging circuit 48, a set point circuit 50, and four bushing segment current shunting circuits 52A, 52B, 52C and 52D, each of which controls the temperature of one bushing segment by controlling the amount of electrical current passing through each respective segment. For the sake of clarity, during the following discussion, reference will be made only to the individual elements of circuit 52B which controls the temperature of bushing segment B and the numerals identifying elements for the circuit will be followed by the letter B. However, it should be noted that each of the shunting circuits is identical, except as noted below. Although the circuit shown in FIG. 2 is a preferred embodiment of the invention, it is obvious to one skilled in the art that other circuit configurations may be used to affect the bushing temperature control as taught in this disclosure.

In operation the output of the sensors 40 is fed through convertor 44 to the controller 28. Temperature averaging circuit 48 averages the segment temperatures and feeds the results via line 53 to the primary controller 54 which is connected through line 56 to the power pack 14 to control the overall current provided to the bushing 22 through lines 24 and 26. Primary controller 54 compares the average temperature to a predetermined average temperature. If the measured average temperature is greater than the desired average temperature, controller 54 will bring about a reduction in the total current to the bushing 22 to cool the bushing 22. Conversely, if the measured average temperature is less than the desired average temperature, the controller 54 will bring about an increase in current to increase the temperature of the bushing 22.

It is apparent that this type of control, although it will stabilize the average bushing temperature, alone will not adjust the individual bushing segments to a desired temperature profile. To this end, the signals from the convertor 44 are also fed to the set point circuits 50 of the controller 28 which, in turn, develops a set point reference used to control the bushing segment temperatures. The individual segment temperatures are compared to the set point reference and the amount of current shunted about each segment is adjusted accordingly. Although not limiting in the present invention, in order to maximize the range of operation in the preferred embodiment of the invention, circuit 50 of controller 28 identifies the lowest temperature of the bushing segments which is then used to establish the set point for the remaining three segments. By using this method, no current is shunted through at least one of the segments, i.e., the segment used to establish the set point, and a minimum amount of current is shunted through the remaining segments to cool the individual bushing segment and lower their temperature to that of the coolest bushing segment. Although not limiting in the present invention, in the preferred embodiment, each circuit includes a bias potentiometer 58, and, in particular, circuit 52B includes a bias potentiometer 58B, which is set to shunt a minimum amount of current from each bushing segment. The potentiometers 58 provide additional controls as will be discussed later.

Referring to circuit 50 in FIG. 2, diodes 60A, 60B, 60C and 60D in conjunction with resistor 62 clamp the input voltage to resistor 64 to the lowest value output by the sensors 40. The output from resistor 64 is fed to amplifier 66, which is a non-inverting amplifier of gain 1, so that the output of amplifier 66 is the least positive of the four input voltages from the temperature sensors 40 plus a diode drop. Diode 68 in conjunction with resistor 70 is used to remove this drop. The signal from amplifier 66 is fed to inverting amplifier 72 which produces an output signal that is opposite the sign of the lowest voltage. This output signal is the set point and is fed to bus 74 which distributes the voltage to circuits 52. The value of the voltage on the set point bus 74 is the desired common balance point. Thus, the individual circuits 52 will attempt to maintain each of the segment temperatures balanced at the values set by the set point bus 74.

As discussed, the output of the amplifier 72, i.e., the set point, is the negative of the minimum of the four voltage outputs from the sensors 40. This output is individually summed with the output from each temperature sensor 40 at a summing junction 76 for each respective circuit 52. The resultant represents an error current which is fed to amplifiers 78 of circuits 52. Referring to FIG. 2, summing junction 76B sums the voltage from line 46B of bushing segment B with the output from amplifier 72 through set point bus 74 to determine the error current and feeds the error current to amplifier 78B. The output of amplifier 78B feeds a variable current controller 80B which controls the amount of current shunted through circuit 52B. Although not limiting in the present invention, in the preferred embodiment the current controller 80B is a transistor. The current shunted through circuit 52B by the controller 80B is proportional to the current through resistor 82B which is controlled by the gain in amplifier 78B [i.e., the current through resistor $(84B+86B)/86B$]. Capacitor 88B provides filtering that enables the circuit 52B to work with full wave rectified 60 Hz power. If the sum of the set point and the segment temperature is less than or equal to zero, amplifier 78B remains off and there is no change in the amount of current diverted from bushing 22 through segment transformer 90B by current controller 80B. If this sum is greater than zero, amplifier 78B is activated and the amount of current diverted through segment transformer 90B by current controller 80B is increased in proportion to the value of the error current.

Based on the teachings in this disclosure, it is obvious that the set point and error current can be determined in various other fashions as is known in the art and still provide the equivalent control information necessary to shunt the correct amount of current from the bushing segments. For example, the minimum segment temperature may serve as the set point and the error current may be determined as the difference between the measured segment temperature and the set point temperature. As another alternative, the set point may be the average segment temperature with the current shunting by circuit 52 being a function of the relative value of the measured segment temperature as compared to the set point temperature.

The circuit shown in FIG. 2 represents a proportional controller. If faster and more accurate control is desired, each summing junction 76 may be replaced by three amplifiers (not shown) forming a PID (proportional integral differential) controller that multiplies, integrates, and differentiates the error current. In addition, the circuit may be further modified to incorporate the set point calculation function, the summing function and the power pack control function, i.e., controller 54, into the internal microprocessor of the convertor 44. The design of a PID circuit is discussed in the book entitled *Automatic Control Systems—Fourth Edition* by Benjamin C. Kuo, published by Prentice-Hall, Inc. at page 471, which teachings are hereby incorporated by reference.

If desired, the heat generated by the transistor 80 can be minimized by constructing circuit 52 such that rather than the transistor being always energized and shunting a portion of the current away from the bushing segment, the transistor 80 would be fully turned on or off as required, to shunt the necessary current. Intermediate values of current are provided by varying the duty cycle of the "on time". This is commonly known in the art as pulse width modulation.

Although not limited in the present invention, an additional transformer can be utilized to increase the voltage burden to increase the current shunting range of the circuits 52. In the particular embodiment shown in FIG. 2, circuit 52B includes a burden transformer 92 to increase the range in segments A and B and circuit 52C includes a burden transformer 94 to increase the range in segments C and D.

As discussed earlier, in the preferred embodiment of the invention, each circuit 52 includes a bias potentiometer 58 which can be set to guarantee that a minimum amount of current will always be shunted through the circuit. In addition, the potentiometer 58 can be used to vary the set point values for each circuit 52. In this fashion the temperature of the individual segments can be varied from each other. For example, if the desired temperature of segment A is greater than that for segment B, the potentiometers 58A and 58B would be set relative to each other such that the set point signal received by amplifier 78A in circuit 52A would always be greater than that received by amplifier 78B in circuit 54B. As a result, all other factors being equal, circuit 52A would always shunt less current than circuit 52B, and therefore, segment A would be hotter than segment B.

Although not limiting in the present invention, referring to FIG. 2, the resistance values for one particular embodiment of the invention are shown for the temperature averaging circuit 48, the set point circuit 50, and the shunting circuit 52C.

In summary, the control sequence for the controller 28 operates as follows:

A. Determine temperature of each segment.
B. Determine actual average temperature of bushing and compare to predetermined average temperature.
C. If actual average temperature is greater than desired average temperature, reduce bushing current. If actual average temperature is less than desired average temperature, increase bushing current.
D. Establish a set point temperature.
E. Calculate an error current for each bushing segment based on the set point and the respective measured segment temperature.
F. Vary the amount of current shunted from a bushing segment based on the error current for the segment.
G. Repeat control sequence.

In the preferred embodiment of the invention, the set point temperature is the opposite sign of the minimum measured segment temperature and the error current is the sum of the set point and the actual segment temperature. If error current is greater than 0, bushing current is shunted through the shunting circuit in proportion to the value of the error signal. If the bushing signal equals 0, no action is taken.

The control of the bushing temperature as disclosed is a dynamic, interactive process that is repeated continuously. In particular, as the primary controller 54 adjusts the overall bushing current to drive the actual overall average bushing temperature toward the desired average temperature, the individual shunting circuits 52 adjust the segment temperatures to maintain the desired bushing temperature profile and/or correct any local fluctuation or disturbance in segment temperature.

The forms of this invention shown and described in the disclosure represent illustratively preferred embodiments and it is understood that various changes may be made without departing from the scope of the present invention as defined by the claims that follow.

I claim:

1. A method of controlling temperature of a glass fiber forming bushing having multiple bushing segments comprising:
   a. establishing a desired average bushing temperature;
   b. providing electrical current to said bushing;
   c. measuring the temperature of each bushing segment of said bushing;
   d. calculating the actual average temperature of said bushing;
   e. establishing one segment set point temperature based on said measured temperatures of said bushing segments;
   f. comparing said actual average bushing temperature to said desired average bushing temperature;
   g. adjusting bushing current in response to said bushing temperature comparison;
   h. comparing said measured temperature of each of said bushing segments to said segment set point temperature;
   i. varying current to each bushing segment in response to said bushing segment temperature comparison; and
   j. repeating steps a. through i. wherein said segment set point temperature establishing step establishes a new segment set point temperature based on the then measured bushing segment temperatures.

2. The method as in claim 1 wherein said segment set point temperature establishing step includes the step of setting said segment set point temperature as the minimum measured bushing segment temperature.

3. The method as in claim 1 wherein said segment set point temperature establishing step includes the step of setting said segment set point temperature as the average of said measured bushing segment temperatures.

4. The method as in claim 1 wherein said current adjusting step includes the steps of increasing current to said bushing when said actual average bushing temperature is less than said desired average bushing temperature and reducing current to said bushing when said actual average bushing temperature is greater than said desired average bushing temperature.

5. The method as in claim 1 wherein said bushing segment temperature comparing step includes the step of determining an error for each of said bushing segments as the difference between said measured segment temperature and said segment set point temperature and said current varying step includes the step of varying current to each bushing segment in response to said error for said bushing segment.

6. The method as in claim 5 wherein said current varying step includes the step of diverting current from selected ones of said bushing segments.

7. The method as in claim 6 wherein said current diverting step includes diverting current in proportion to the magnitude of said error.

8. The method as in claim 1 further including the steps of continuously diverting predetermined amounts of current from each of said segments.

9. The method as in claim 1 wherein said current varying step includes the step of diverting current from selected ones of said bushing segments.

10. The method as in claim 1 wherein said current adjusting step includes the steps of increasing current to said bushing when said actual average bushing temperature is less than said desired average bushing temperature and reducing current to said bushing when said actual average bushing temperature is greater than said desired average bushing temperature, said bushing segment temperature comparing step includes the step of determining an error for each of said bushing segments as the difference between said measured segment temperature and said segment set point temperature and said current varying step further includes the step of varying current to each bushing segment in response to said error for said bushing segment.

11. The method as in claim 10 wherein said current varying step includes the step of diverting current from said bushing segments in proportion to the magnitude of said error.

12. The method as in claim 10 wherein said establishing step includes the step of setting said segment set point temperature as the minimum measured bushing segment temperature.

13. The method as in claim 10 wherein said establishing step includes the step of setting said segment set point temperature as the average of said measured bushing segment temperatures.

14. An apparatus for controlling temperature of a glass fiber forming bushing having multiple bushing segments comprising:
   means to measure the temperature of each bushing segment of a multiple segment bushing;

means to determine the actual average temperature of said bushing;

means to develop one segment set point temperature based on said measured segment temperatures;

means to compare said actual average bushing temperature to a desired average bushing temperature;

means to adjust current to said bushing in response to said bushing temperature comparison;

means to compare said measured temperature of each of said bushing segments to said segment set point temperature; and means to vary current to each bushing segment in response to said bushing segment temperature comparison.

15. The apparatus as in claim 14 wherein said temperature measuring means is a fiber optics temperature measuring system.

16. The apparatus as in claim 14 wherein said temperature measuring means includes at least one thermocouple positioned on the bottom of the bushing.

17. The apparatus as in claim 14 wherein said current varying means includes a circuit having a transistor.

18. The apparatus as in claim 17 wherein said transistor is a PWM switched transistor.

19. The apparatus as in claim 14 wherein said comparing means is a current summing junction.

20. The apparatus as in claim 14 wherein said current varying means is a PID circuit.

21. The apparatus as in claim 14 wherein said current varying means includes means to individually shunt current from each of said bushing segments.

22. The apparatus as in claim 21 further including means to increase the maximum amount of current that can be shunted by said current shunting means.

23. The apparatus as in claim 22 wherein said increasing means includes a transformer connected in series with said shunting circuits to increase the voltage to said circuits.

24. The apparatus as in claim 21 wherein said shunting means includes means to continuously divert predetermined amounts of current from each of said bushing segments and means to vary said predetermined amounts.

* * * * *

UNITED STATES PATENT AND TRADEMARK OFFICE
CERTIFICATE OF CORRECTION

PATENT NO. : 5,051,121
DATED : September 24, 1991
INVENTOR(S) : Reed H. Grundy

It is certified that error appears in the above-indentified patent and that said Letters Patent is hereby corrected as shown below:

Claim 5, column 8, line 22, delete the word "segment".
Claim 5, column 8, line 23, add the word --segment-- after "and said".

Signed and Sealed this

Fourteenth Day of October, 1997

Attest:

BRUCE LEHMAN

*Attesting Officer*   Commissioner of Patents and Trademarks